Figure 1:
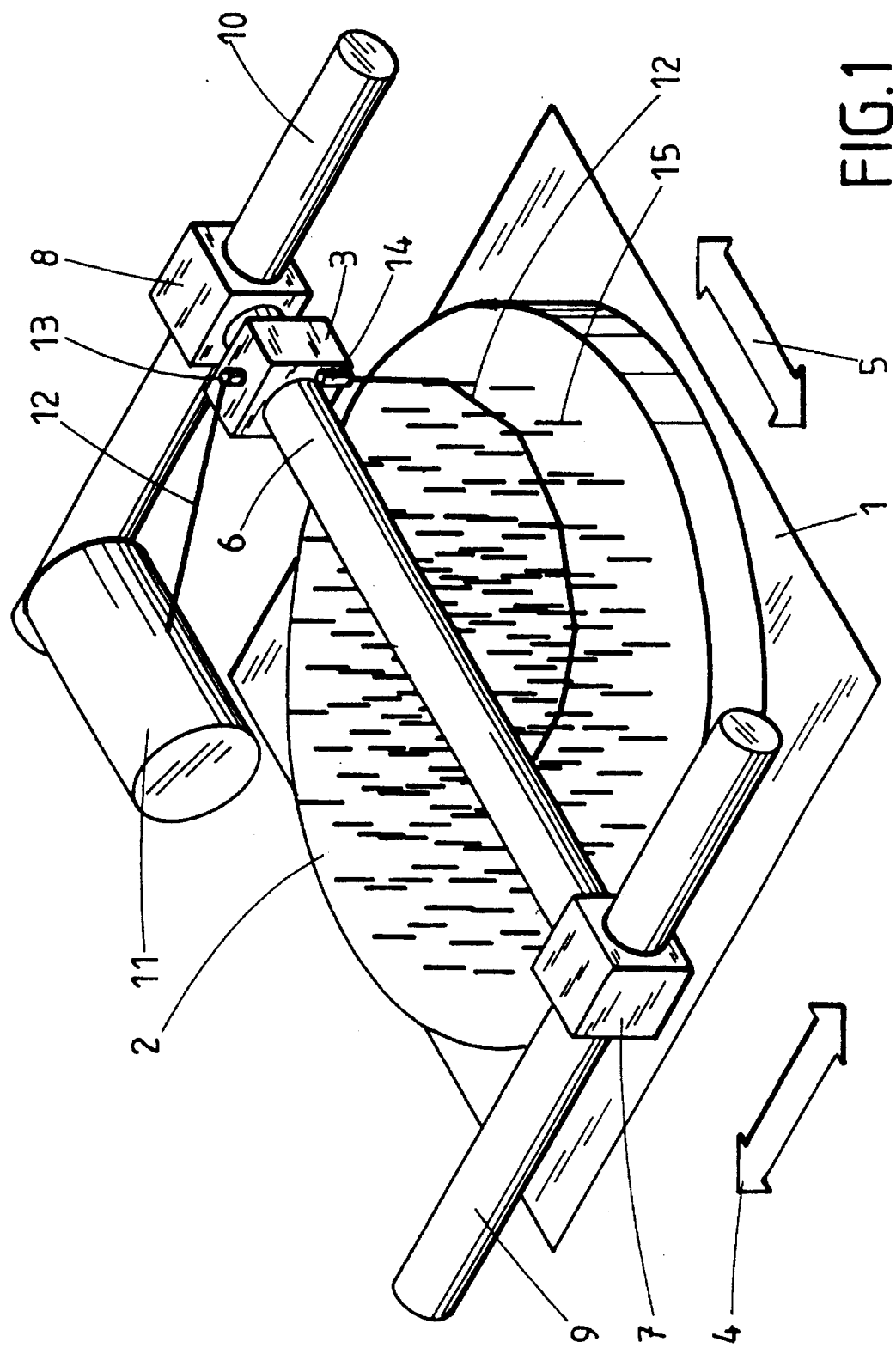

United States Patent

Rector

[11] Patent Number: 5,558,738
[45] Date of Patent: Sep. 24, 1996

[54] METHOD FOR LAYING DOWN THREADS

[76] Inventor: Horst D. Rector, Brunnenstrasse 70, D-52441 Linnich, Germany

[21] Appl. No.: 132,365

[22] Filed: Oct. 5, 1993

[30] Foreign Application Priority Data

Oct. 9, 1992 [DE] Germany .......................... 42 34 083.7

[51] Int. Cl.⁶ .................................................. B65H 81/00
[52] U.S. Cl. .......................... 156/175; 156/169; 156/173; 156/296; 192/107 M
[58] Field of Search .................................... 156/172, 173, 156/166, 169, 161, 175, 296; 192/107 M

[56] References Cited

U.S. PATENT DOCUMENTS

| 2,150,937 | 3/1939 | Novak | 192/107 M |
| 2,263,500 | 11/1941 | Hutchinson et al. | 242/1 |
| 3,713,934 | 1/1973 | Morton | 156/173 |
| 3,743,069 | 7/1973 | Barnett et al. | 156/173 X |
| 3,977,273 | 8/1976 | Ernst | 156/169 X |
| 4,114,962 | 9/1978 | König et al. | 156/172 X |
| 4,118,528 | 10/1978 | Lowry | 156/172 X |
| 4,130,537 | 12/1978 | Bohrer | 428/273 X |
| 4,137,354 | 1/1979 | Mayes, Jr. et al. | 156/175 X |
| 4,735,672 | 4/1988 | Blad | 156/361 |
| 4,765,198 | 8/1988 | Stravrinidis | 156/161 X |
| 4,976,012 | 12/1990 | McConnell | 156/181 X |
| 5,082,514 | 1/1992 | Howell | 156/175 |
| 5,323,978 | 6/1994 | Watkins | 156/447 X |

FOREIGN PATENT DOCUMENTS 3003666  8/1981  Germany .............................. 156/296

Primary Examiner—Jeff H. Aftergut
Attorney, Agent, or Firm—Renner, Otto, Boisselle & Sklar

[57] ABSTRACT

There is disclosed a process and apparatus for depositing threads such as textile threads and in particular glass fibre threads, the threads being continuously supplied on a curved path onto a support plate and around fixed points which are arranged movably on it, formed by movable pins, so as to be laid down in a controlled manner in any desired configuration, in order for example to form a reinforcement for fibre-reinforced articles made chiefly of plastics, in which the individual threads are arranged directed along the lines of stress and also in the regions of high thread density no excessive thickenings are produced at the points where they cross.

12 Claims, 5 Drawing Sheets

METHOD FOR LAYING DOWN THREADS

The invention relates to a method of laying down threads, for example for laying down threads serving as reinforcement or strengthening of fibre-reinforced articles made chiefly of plastics, such as rotationally symmetrical discs, in particular grinding or cutting discs, for example textile threads and in particular threads or strands made of glass fibres. The invention furthermore relates to apparatus for carrying out this method.

It is known (DE-B-1 291 648), to provide grinding discs with a reinforcement or strengthening of glass fibre threads. The threads in this arrangement are for example laid out in a star pattern so that the density of threads increases from the outer rim towards the centre of the grinding disc. With this layout none of the threads of the reinforcement or strengthening lie along the lines of stress. Moreover around the hub or the central opening of the grinding disc the density of the reinforcing threads increases so markedly that here there is a significant thickening of the reinforcement, which is unsatisfactory for the production of grinding discs of uniform thickness and accordingly is not wanted.

The invention is based on solving the problem of laying down threads serving as reinforcement or strengthening of plate-shaped articles and in particular rotationally symmetrical discs, so that a disposition of the threads is achieved over the area of the article which is largely directed along the lines of the stress and excessive concentrations of threads which lead to local thickenings and thereby inequalities of the array of threads, are avoided.

This problem is solved according to the invention by a process for laying down threads; for example, for depositing as reinforcement or strengthening of fibre-reinforced articles made chiefly of plastics such as rotationally symmetrical discs, in particular grinding or cutting discs, threads which serve for this purpose such as textile threads and in particular threads or strands made of glass fibres, including the steps of feeding each of the threads continuously along a curved path and depositing each of the threads around variable fixed points arranged within the curved path. This problem is furthermore solved by apparatus of the kind having the characterizing features of the aforementioned process wherein the threads are drawn from a reel, and then provided with a reaction resin, and then laid to form a drum. Advantageous embodiments of the invention are the subject matter of the subsidiary claims.

According to the invention the threads employed as reinforcement or strengthening of articles for example of flat shape such as rotationally symmetrical discs are laid so that the threads are distributed over the area in accordance with the directions of the stress. In particular the laying down of the threads is such that even with a high thread density only two threads lie over one another at the points where the threads cross, so as to avoid excessive local thickening of the thread layout. Accordingly the thread layout has an almost uniform thickness over the entire area of the fibre-reinforced article and has a favourable thread density or thread distribution.

When the threads are laid down for reinforcing strengthening discs they are preferably laid in accordance with the invention in a spiral layout in order to achieve within the thread layout a distribution of the threads which is along the directions of stress, and to achieve the result that there are always only two threads overlying one another at the points of intersection of the threads.

In this arrangement the thread layout can be produced from a single thread or from a number of threads fed in simultaneously.

Preferably the threads are laid down on a support which has a number of upstanding pins forming guide points for the thread which is deposited. These pins are arranged to be retractable so that they can be partially or wholly withdrawn and taken back into the the support in order to be able to perform the laying step easily and to be able to remove the finished body of the self-supporting thread layout from the support and to be able to carry out further handling and treatment.

The pins can be provided with individual actuation or a drive which is common to several of them or all of them. In the first-mentioned case the laying down of the individual threads can be determined by controlled raising and retraction of individual pins or groups of pins.

The threads can be fed under control from a thread supply and laid on the support in the desired manner around the respective pins. In this arrangement either the thread guide can be moved over the support in a predetermined manner for depositing the threads or alternatively the support can be shifted, for example, rotated, in relation to a stationary thread guide.

Prepregs are for example employed as the threads.

After the threads have been deposited on the pin-carrying support, a heated pressure plate can for example be moved over the support and lowered on to it. In this arrangement the pressure plate comes into contact with the pins and forces them back into the support until the pressure plate comes into contact with the array of threads. In this way the array of threads is squeezed between the support and the pressure plate so that the threads come into intimate contact at the points where they cross and are thereby bonded together. Simultaneously the ends of the threads are cut off by a cutting device which can be present in the pressure plate and/or the support.

After the squeezing and cutting of the ends of the threads the pressure plate returns to its starting position. The pins are now retracted fully into the support so that the threads, which are under longitudinal tension, are pulled into the region of the pins and accordingly prevent renewed introduction of the pins into the array of threads. The squeezed array of threads is then lifted off the support, and in the support the pins are returned to their raised starting positions. The squeezed array of threads is lifted up by the raising of the pins and can be removed from the upper ends of the pins for further handling.

After the pressing step the array of threads forms a flat body having a certain degree of stiffness and is suitable for reinforcing or strengthening grinding discs or cutting discs. However, reinforcements for articles of another shape, for example rectangular plates, can also be laid down.

Although the array of threads can be produced from a single thread, it is also possible to form the body from a number of individual threads which are each introduced from their own supply and their own thread guide.

Figure 2:
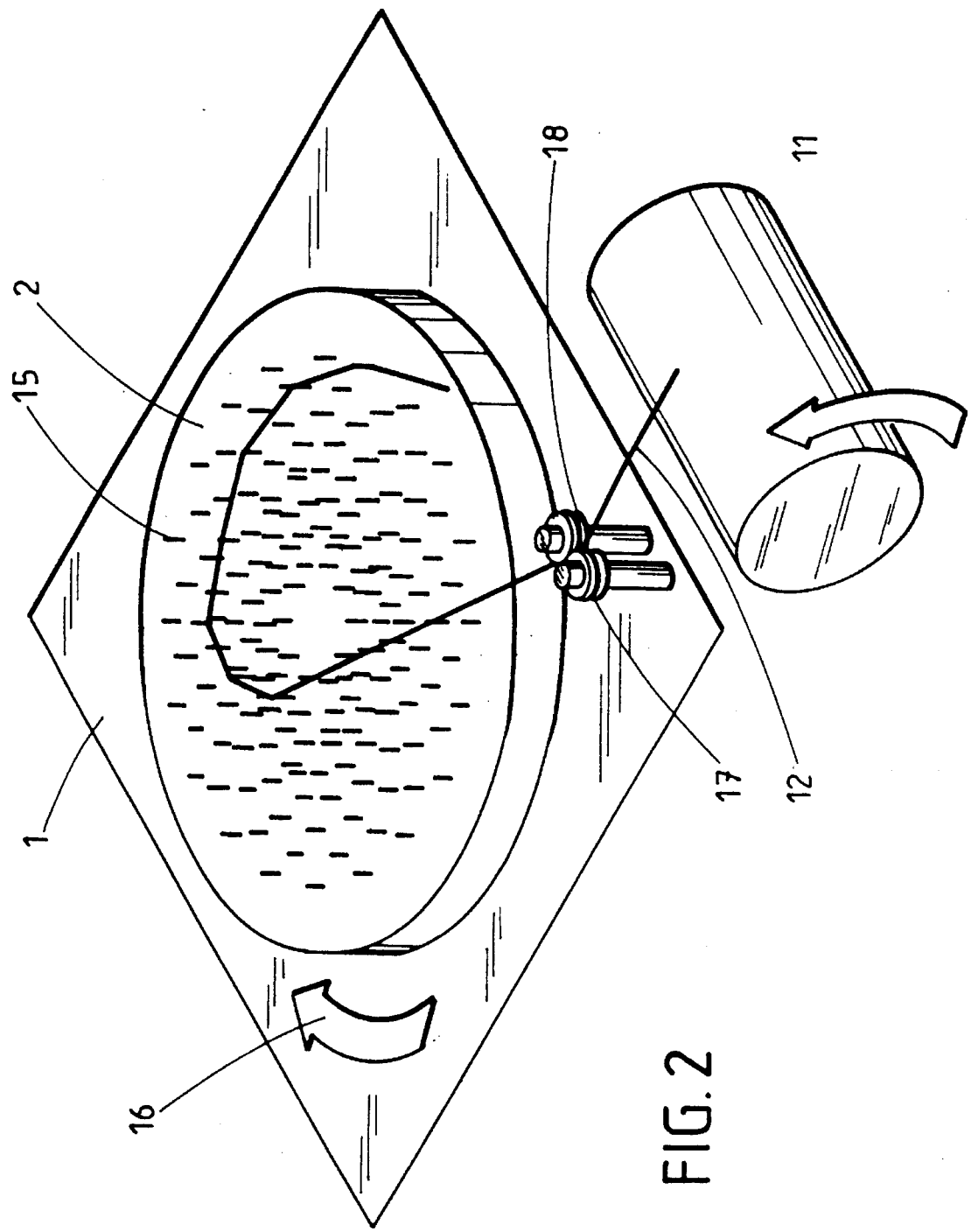

Illustrated in the drawing are some embodiments by way of example of apparatus according to the invention for laying down threads to form a thread body directed along the lines of stress, as well as the course of the method according to the invention; in the drawings:

FIG. 1 is a perspective view of a first embodiment of the apparatus, in which a thread guide can be moved in a controlled manner in two directions above a circular support plate carrying upstanding pins, in order to deposit a thread in accordance with a predetermined pattern on the support plate between the upstanding pins or around selected pins, FIG. 2 is a perspective view of a second embodiment of the apparatus, in which a thread is fed from a fixed thread guide over a rotatably mounted disc-shaped support plate having upstanding pins on its surface.

Figure 3:
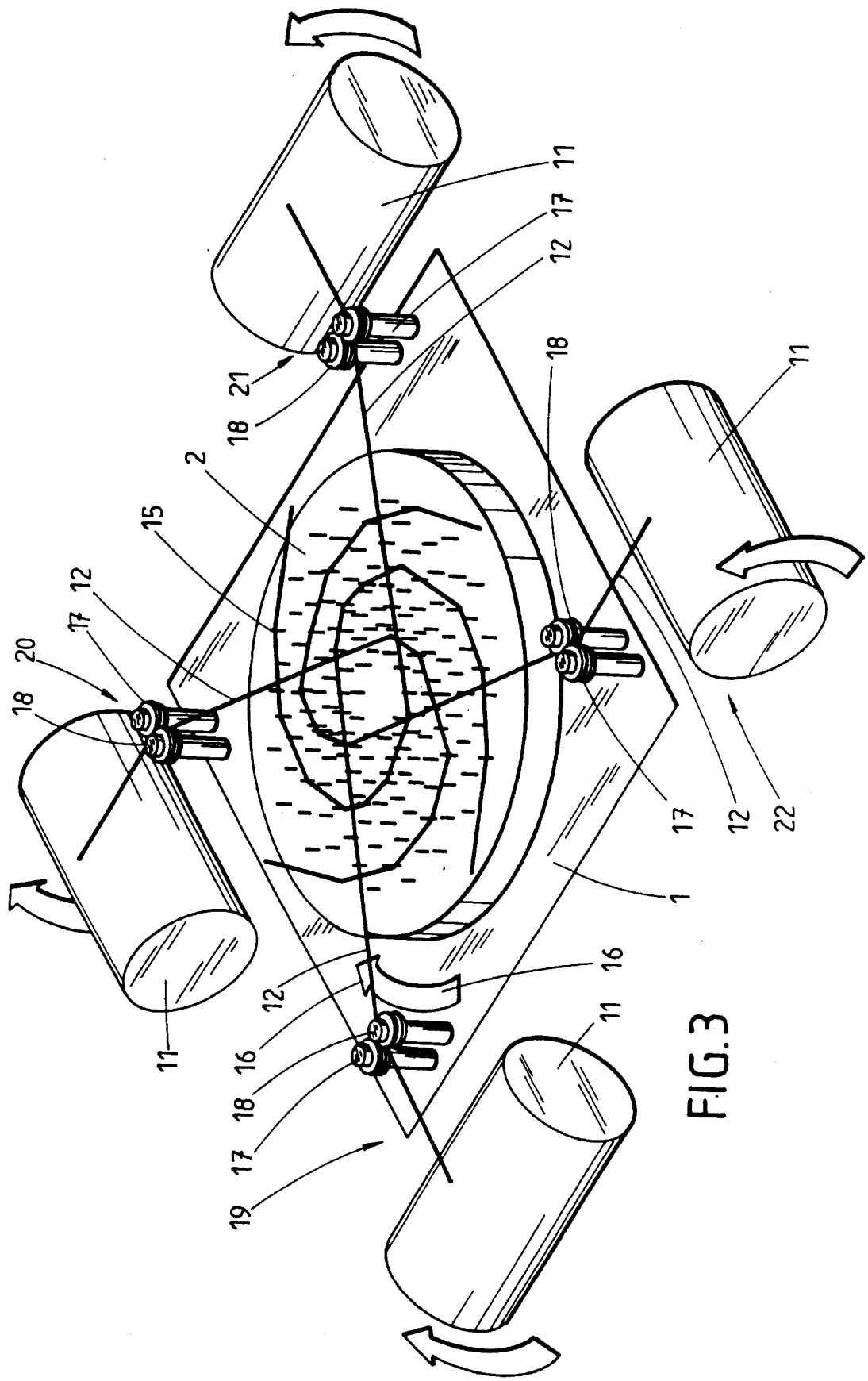
Figure 4:
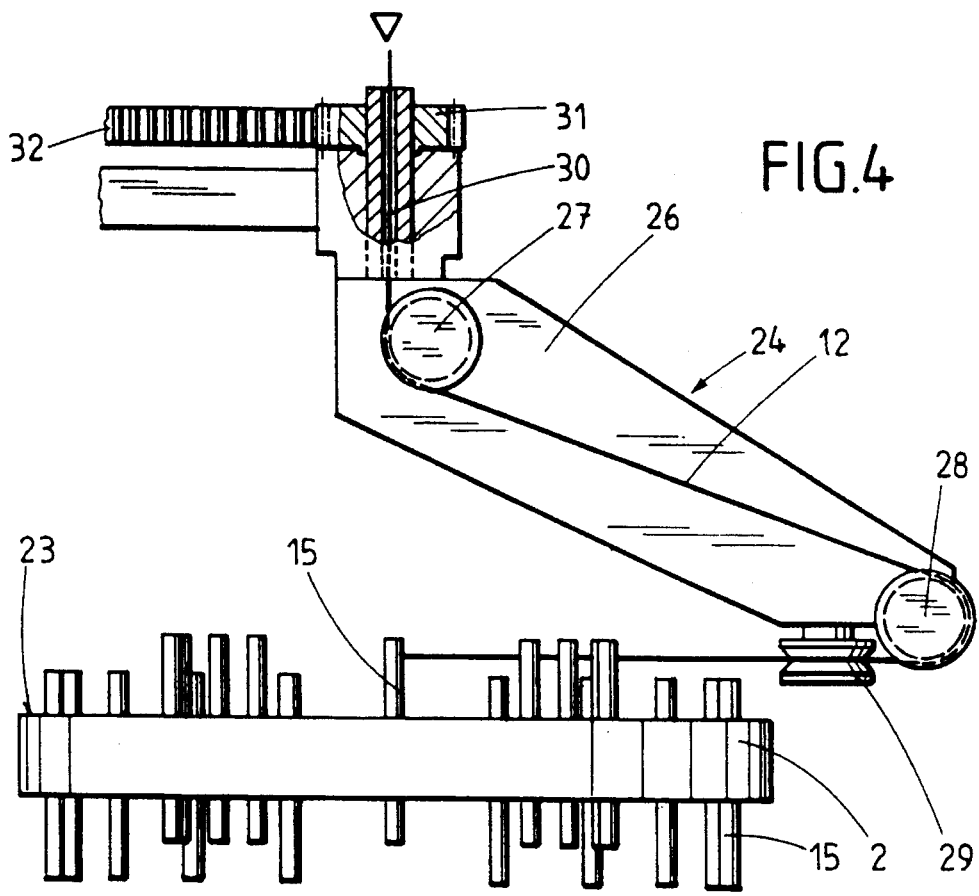
Figure 5:
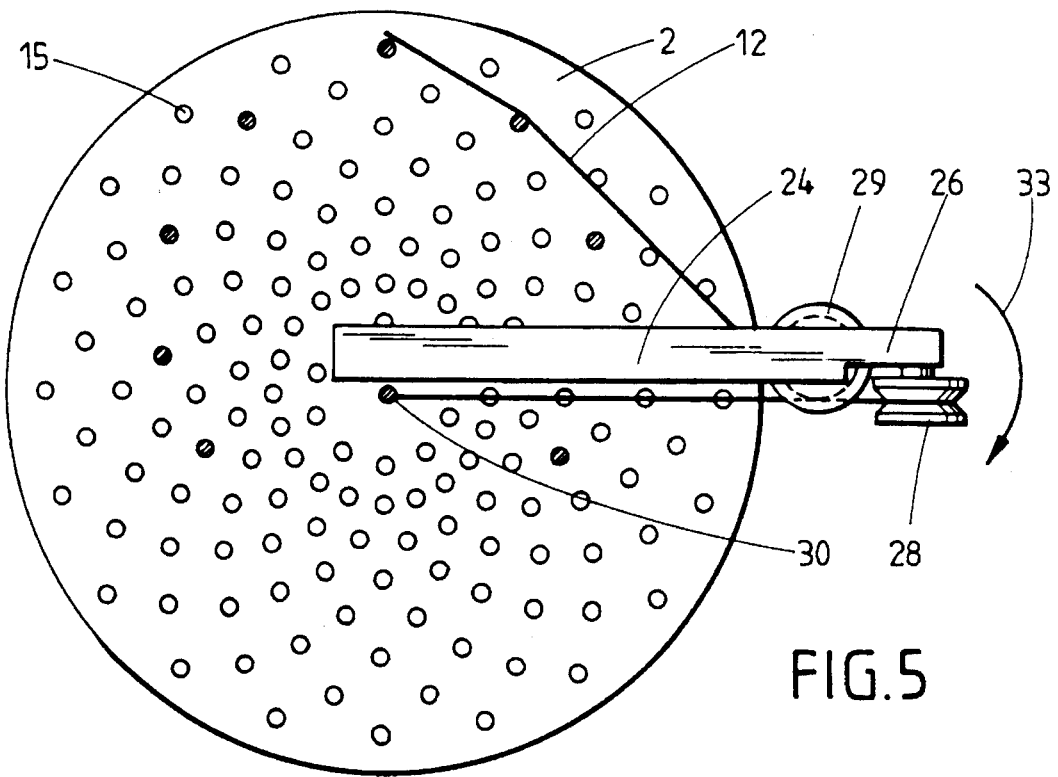
Figure 6:
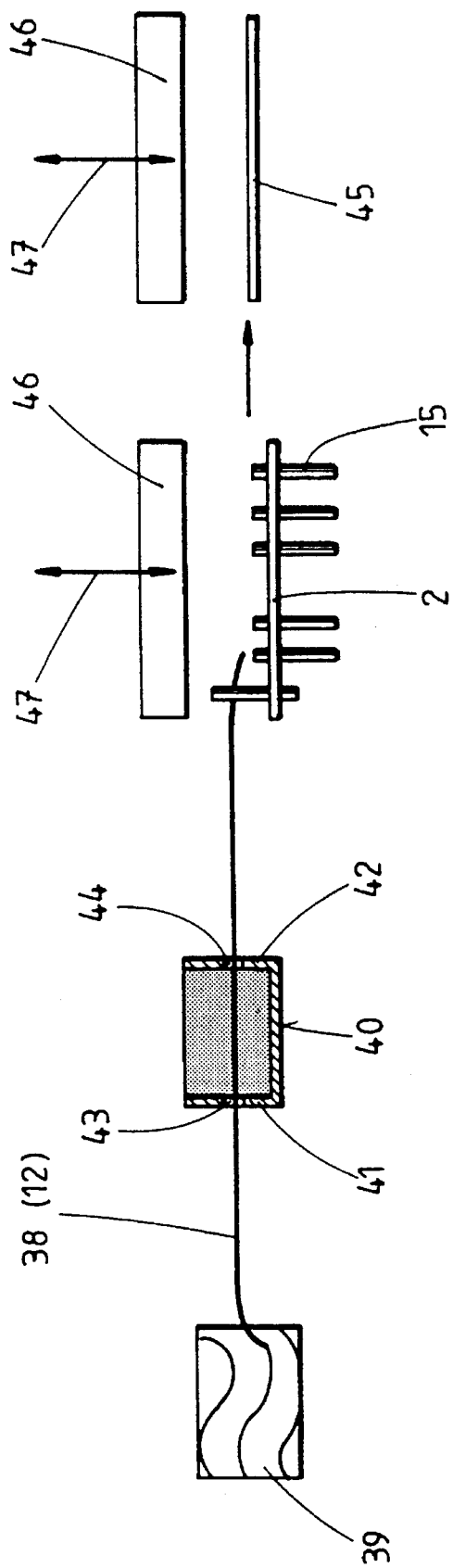

FIG. 3 is a perspective view of a further embodiment of the apparatus, in which four threads are supplied from four stationary thread guides to a disc-shaped rotatably mounted support plate having upstanding pins on its upper face, FIG. 4 is a side view of a further embodiment of the apparatus, from which it can be seen how a thread is laid by a rotating thread guide around selected upstanding pins on a stationary support plate, FIG. 5 is as a plan view of the apparatus of FIG. 4 and FIG. 6 is a diagram showing the course of the process according to the invention.

The apparatus shown in FIG. 1 for depositing a thread (12) to form a drum-shaped or circular body of thread has on a base (1), not illustrated further, a stationary round disc-shaped support plate (2), over which a thread guide (3) is mounted to move in two dimensions, as indicated by the double arrows (4) and (5). The thread guide (3) is thus movable both along an X-axis and also along a Y-axis.

For this purpose the thread guide (3) is guided on a frame (6) formed by a guide rod which is secured at its ends on guide blocks (7) and (8) which are guided to slide in the direction of the double arrow (4) on respective guide columns (9) and (10) extending at right angles to the rod (6). The drive for achieving these movements is not shown in FIG. 1.

A thread 12 is fed from a storage reel 11 to the thread guide 3 which, as shown in FIG. 1, has an entry bush 13 and an exit bush 14. The exit bush 14 steers the thread (12) to the support plate (2) from which a number of pins (15) project, serving as a guide points around which the thread (12) is laid in a controlled manner.

The movements of the thread guide (3) are computer-controlled or controlled mechanically, for example, by means of an eccentric so that a desired deposition of the thread (12) can take place around selected pins (15). The pins (15) are uniformly distributed over the surface of the support plate (2) and can for example be inserted in a pattern controlled as desired.

The deposition of the thread (12) takes place, for example as can be seen in FIG. 1, in a somewhat spiral form so that no excessive thickenings can arise at the points where the deposited threads (2) cross.

The embodiment of FIG. 2 differs from that of FIG. 1 substantially in that the circular disc-shaped support plate is mounted rotatably on the base (1), as indicated by an arrow (16), and that two mutually co-operating guide rollers (17) and (18) are mounted to rotatate on the base (1) as a thread guide and the thread (12) coming from the storage reel (11) passes between them. Thus, in this embodiment the thread guide is stationary and the support plate (2) is movable relative to it, namely by rotation.

In the embodiment shown in FIG. 3 four stationary thread guides (19), (20), (21) and (22) are provided. Apart from this, this apparatus is constructed as shown in FIG. 2.

It can be seen from FIG. 4 that the pins (15) provided on the support plate 2 can be raised above the surface (23) of the support plate (2) to different extents in a manner not further illustrated, so that a thread (12) fed from a thread guide (24) can be laid around selected pins (15), shown hatched in FIG. 5. The pins (15) are controlled according to the desired configuration of the layout to project from this support plate (2), so that the thread (12) is only laid around those pins which project the farthest. When the thread has been laid around the pins which project the farthest these pins can be actuated to retract into the partially withdrawn position, and they take with them the threads which lie around them, so as to deposit them on the array of threads already present on the apparatus and not further illustrated in the drawing.

The movement of the thread (12) guided around the pins (15) which project the most can be helped by arranging that the pins (15) are provided on their upper ends with a widened-out portion or annular recess, not illustrated here.

Also in this kind of deposition of the threads the squeezing of the body of thread and the ejection of the compressed thread body takes place in a similar manner to that described in conjunction with FIG. 1.

FIG. 4 reveals that all the pins (15) are of the same length so that the length of them that projects below is inversely proportional to the length projecting above the upper face (23). For controlling the positions of the individual pins (15) a corresponding control device can be provided underneath the support plate (2), for example a cam control which shifts the pins (15) individually and/or in groups.

In the embodiment shown in FIGS. 4 and 5 the thread guide (24) has a cantilever arm (26) with direction-changing rollers (27) and (28) and a guide roller (29) mounted on it and through which the thread (12) is guided, The arm (26) is secured to a thread guide (30) provided with a pinion (31) which engages a stationary gearwheel (32) so that the arm (26) can be moved or turned as shown by the arrow (33) in FIG. 5 in order to move in an arc over the stationary support plate (2) and in this way to lay the thread (12) in the desired pattern.

Although the thread guide (3) is shown in FIG. 1 as having a stationary entry bush (13) and outlet bush (14), the thread guide which is movable in a controlled manner in plan view in accordance with the X-axis and the Y-axis and thus in practice in two dimensions in one plane, can also be provided with direction-changing rollers for guiding the thread, similarly to the layout illustrated in FIGS. 4 and 5. In this way it is possible to deposit the thread (12) with a short deposit length around selected individual pins (15) or groups of pins and then to be able to draw the deposited thread onto the support plate (2), namely in that the thread guide performs over the support plate the pattern predetermined by the selected pins.

Where the thread (12) is to be deposited around individual pins (15), or pins selected in groups, using the apparatus according to FIG. 1, it is of advantage to be able to advance the pins (15) into the depositing position individually or in groups so that each thread can be fed by means of direction-changing rollers as shown in FIGS. 4 and 5 without being able to be prevented by upstanding pins which are not be employed.

In that case it is true that the lowermost edge or the lowermost ends of the lowermost guide roller (29) provided for depositing a thread (12) lies above the uppermost end of the partially withdrawn pin (15) as indicated in FIG. 4. Accordingly, the depositing head or its guide rollers (29) can be driven in a controlled manner along the curve desired for the deposition of the thread and the thread (12) can be deposited with as short a free length as possible without colliding with the partially raised pins (15).

As shown in FIG. 6 a thread (38) comprising a glass fibre roving is withdrawn from a storage reel (39) and fed to a container (40) filled with a resin melt and having respective openings (43) and (44) in its end faces (41) and (42), through which the thread (38) can pass.

The thread (38) can be an initially untreated glass fibre roving. In this case the thread (38) is immersed in the container (40) in a reaction resin and a reaction medium, a hardener, before it is fed to the support plate (2) and there laid around the vertically displaceable pins (15).

The thread (38) coming from the storage reel (39) and corresponding to the thread (12) of FIGS. 1 to 5 can already from the start be a glass fibre roving with an embedded reaction medium, that is to say with an embedded hardener. In this case the container (40) only needs to contain molten reaction resin, in order to pre-treat the thread (38) for deposition in the desired manner.

In other words the thread 38 comprises a glass fibre roving to which thermoplastic material is added before it reaches the point of deposition.

The thread is laid on the support plate (2) around the vertically movable pins (15) in the manner described so as to result in a drum (45) made up of one or more threads. This drum is still not sufficiently stable after the deposition. On the contrary it is envisaged that it should be squeezed or pressed while hot for final stabilisation, for which purpose, for example as shown on the left in FIG. 6, there is arranged above the support plate (2) a heated pressure plate (46) which can be lowered and raised as indicated by a double arrow (47). When the pressure plate 14 is lowered onto the support plate (2) it presses the pins 15 into the support plate (2) until it comes into contact with the roving (45) present on the support plate (2) and subjects it to pressure.

However, it is also shown on the right-hand side of FIG. 6 that the heated pressure plate (46) can be arranged alongside the support plate (2) so that the deposited drum (45) is only hot-pressed and thus finally stabilised after ejection from the support plate (2).

In the hot-pressing process the threads (38) or (12) forming the drum (45) are permanently bonded together at the points where they cross because the thermoplastic material which accompanies the glass fibre roving is softened and after the withdrawal of the pressure plate (46) it cools down so that a bond which cannot easily be released is left between the individual strands of thread at the points where they cross.

I claim:

1. A process for laying down textile threads, for use as reinforcement of fibre-reinforced plastic articles, comprising the steps of continuously feeding at least one thread and depositing said at least one thread around variable fixed points path to produce a thread layout wherein said at least one thread is deposited at least partially in a spiral pattern, said depositing step including guiding portions of said at least one thread from a radially inner region of the thread layout to a radially outer region of the thread layout along respective spiral paths that extend from one diametral side of a central opening of said thread layout to an opposite diametral side of said central opening of said thread layout, and wherein said portions of said at least one thread cross one another at intersection points, and wherein at each said intersection point there are only two of said portions of said at least one thread lying over one another.

2. A process according to claim 1, wherein said at least one thread is drawn from a reel, and then provided with a reaction resin and then laid to form a thread array.

3. A process according to claim 2, wherein said at least one thread comprises a glass fibre roving, there being added to said threads a reaction medium such as a reaction resin serving as a hardener before or on provision with reaction resin.

4. A process according to claim 3, wherein said at least one thread is drawn through a melt of thermoplastic reaction resin before deposition.

5. A process according to claim 3, wherein said thread array is hot-pressed.

6. A process according to claim 2, wherein said at least one thread is drawn through a melt of thermoplastic reaction resin before deposition.

7. A process according to claim 6, wherein said thread array is hot-pressed.

8. A process according to claim 2, wherein said thread array is hot-pressed.

9. A process according to claim 1, including the step of using the thread layout in a rotationally symmetrical disc.

10. A process according to claim 1, including the step of using the thread layout in a rotationally symmetrical grinding or cutting disc.

11. A process according to claim 1, wherein said variable fixed points are provided by a plurality of retractable, upstanding pins disposed for movement parallel to an axis.

12. A process according to claim 1, wherein said at least one thread includes a plurality of threads.

* * * * *